(12) United States Patent
Takehara et al.

(10) Patent No.: US 8,110,938 B2
(45) Date of Patent: Feb. 7, 2012

(54) LINE CONNECTION STRUCTURE FOR ELECTRIC EQUIPMENT AND ELECTRIC VEHICLE

(75) Inventors: Akihide Takehara, Toyota (JP);
Tatsuhiko Mizutani, Toyota (JP);
Makoto Kubota, Anjyo (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 483 days.

(21) Appl. No.: 12/300,947

(22) PCT Filed: May 14, 2007

(86) PCT No.: PCT/JP2007/060296
§ 371 (c)(1),
(2), (4) Date: Nov. 14, 2008

(87) PCT Pub. No.: WO2007/132935
PCT Pub. Date: Nov. 22, 2007

(65) Prior Publication Data
US 2009/0256420 A1      Oct. 15, 2009

(30) Foreign Application Priority Data

May 17, 2006   (JP) .................................. 2006-137908

(51) Int. Cl.
*H02G 3/02* (2006.01)
(52) U.S. Cl. ........................................................ 307/9.1
(58) Field of Classification Search ................... 307/9.1, 307/10.1, 10.8, 42
See application file for complete search history.

(56) References Cited

U.S. PATENT DOCUMENTS

| | | | |
|---|---|---|---|
| 4,403,155 A * | 9/1983 | Aoki et al. ................... 307/10.1 |
| 6,528,899 B1 * | 3/2003 | Saito et al. ................... 307/10.1 |
| 6,907,947 B2 | 6/2005 | Morita et al. |
| 7,269,488 B2 * | 9/2007 | Fuehrer et al. ................. 701/29 |
| 7,398,704 B2 * | 7/2008 | Loscher ....................... 73/866.5 |
| 2004/0200647 A1 | 10/2004 | Shingo et al. |
| 2005/0205316 A1 | 9/2005 | Yamafuji |

FOREIGN PATENT DOCUMENTS

| JP | 63-164113 A | 7/1988 |
|---|---|---|
| JP | 09-264235 A | 10/1997 |

(Continued)

OTHER PUBLICATIONS

Japanese Office Action dated Nov. 15, 2011 with English translation.

*Primary Examiner* — Albert W Paladini
(74) *Attorney, Agent, or Firm* — Sughrue Mion, PLLC

(57) ABSTRACT

A line connection structure for a PCU includes: the PCU mounted in an engine room positioned on a front side of a hybrid vehicle; an air cleaner that is provided on a rear side of the vehicle so as to face the PCU and that includes a resin portion deforming easier than electric equipment; and a cable connected to the PCU. The cable is formed by three-phase cables of U, V, and W phases being gathered. The cable is connected to the PCU on the side surface of the PCU positioned on the vehicular-rear side. The three-phase cables positioned between the PCU and the air cleaner is provided so as to align on the identical plane parallel to the width direction of the hybrid vehicle.

11 Claims, 7 Drawing Sheets

FOREIGN PATENT DOCUMENTS

| | | |
|---|---|---|
| JP | 2002-050385 A | 2/2002 |
| JP | 2003-102111 A | 4/2003 |
| JP | 2003-291663 A | 10/2003 |
| JP | 2001-097052 A | 4/2004 |
| JP | 2004-182220 A | 7/2004 |
| JP | 2004-199914 A | 7/2004 |
| JP | 2004-306846 A | 11/2004 |
| JP | 2005-104386 A | 4/2005 |
| JP | 2005-104387 A | 4/2005 |
| JP | 2005-176569 A | 6/2005 |
| JP | 2005-262894 A | 9/2005 |
| JP | 2006-117051 A | 5/2006 |
| WO | 2006/054134 A2 | 5/2006 |

* cited by examiner

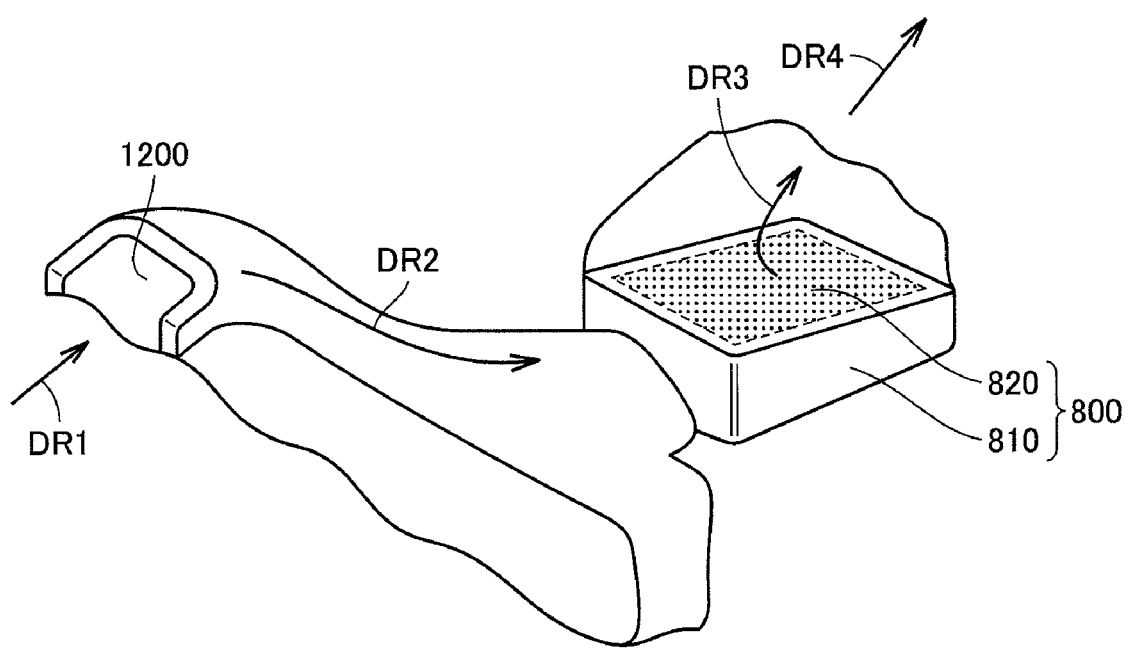

LINE CONNECTION STRUCTURE FOR ELECTRIC EQUIPMENT AND ELECTRIC VEHICLE

TECHNICAL FIELD

The present invention relates to a line connection structure for electric equipment and to an electric vehicle. In particular, the present invention relates to a line connection structure for electric equipment mounted in a closed space of a vehicle, and to an electric vehicle with such a structure.

BACKGROUND ART

Conventionally, electric vehicles having a line connection structure for electric equipment including an inverter or the like mounted in an engine room are known.

For example, Japanese Patent Laying-Open No. 2005-262894 (Patent Document 1) discloses a structure including a bracket that deforms following deformation of a vehicle frame member, and an inverter fixed to the vehicle frame member via the bracket. Here, the inverter also displaces following the displacement of the bracket, whereby a high voltage line connected to the inverter is prevented from being caught between the vehicle frame member and the inverter.

Japanese Patent Laying-Open No. 2003-291663 (Patent Document 2) discloses connecting a high voltage cable, which connects a fuel cell stack behind a control unit and the control unit, to a lower surface on the rear side of the control unit.

Japanese Patent Laying-Open No. 2003-102111 (Patent Document 3) discloses connecting a high voltage cable to a box at a position being offset to the side of a traction motor.

Japanese Patent Laying-Open Nos. 2005-104386 (Patent Document 4) and 2005-104387 (Patent Document 5) disclose connecting a power supply cable to a terminal block provided at a gear case installed on the vehicle rear side of a generator case.

Japanese Patent Laying-Open No. 2004-306846 (Patent Document 6) discloses that a high voltage cable connecting an inverter and a motor-generator is arranged on the rear side of an engine.

In an electric vehicle, electric equipment of relatively high voltage tends to be used, in order to obtain sufficient drive force, for example. Accordingly, a high-voltage cable is connected to such electric equipment. In such a case, when a front structure of the electric equipment deforms due to an external factor such as front collision, the high-voltage cable may be caught between the front structure and the electric equipment.

From another standpoint, when a line is positioned between the electric equipment and a further component, there may be a case where the clearance between the electric equipment and the further component is narrow and not much space is left for arranging the line.

In Patent Document 1, the high voltage line is prevented from being caught between the vehicle frame member and the inverter by providing the bracket that deforms following deformation of the vehicle frame member. Such provision of the bracket increases the number of components.

In Patent Documents 2 and 3, the high voltage line is connected to the lower surface of the electric equipment. Merely connecting the high voltage line to the lower surface of the electric equipment may be insufficient for protecting the cable.

In Patent Documents 4 and 5, the power supply cable is connected to the rear side surface of the generator case. However, Patent Documents 4 and 5 are silent about the idea of reducing the space required for installing the line positioned between the electric equipment and the further component.

Patent Document 6 is silent about where in the inverter the high voltage line is connected to.

DISCLOSURE OF THE INVENTION

An object of the present invention is to provide a line connection structure for electric equipment being capable of protecting a line while suppressing an increase in the number of components and being capable of preventing contact between the line and a further component in a normal mode even when the clearance between the electric equipment and the further component is narrow, and to provide an electric vehicle.

A line connection structure for electric equipment according to the present invention includes: the electric equipment mounted in a closed space positioned on a front side of a vehicle; a line connected to the electric equipment; and a further component provided on a rear side of the vehicle relative to the electric equipment so as to face the electric equipment. Here, the line of a plurality of phases is formed by cables of at least three phases being gathered. The line is connected to the electric equipment on a side surface of the electric equipment positioned on the rear side of the vehicle. The cables of respective phases constituting the line of the plurality of phases positioned between the electric equipment and the further component are arranged so as to align on an identical plane parallel to a width direction of the vehicle.

With the above-described configuration, even when the front structure deforms due to an external factor, the line can be prevented from being caught between the front structure and the electric equipment. Accordingly, it becomes possible to protect the line while suppressing an increase in the number of component. Additionally, since the width of the line in the vehicular front-rear direction can be narrowed, even when the clearance between the electric equipment and the further component is narrow, contact between the line and the further component in a normal mode can be avoided.

In the line connection structure for the electric equipment, preferably, the further component includes a resin portion that deforms easier than the electric equipment.

Thus, even when the electric equipment moves due to an external factor and the line is caught between the electric equipment and the further component, the further component can deform to thereby absorb the shock. As a result, the effect of protecting the line while suppressing an increase in the number of component can be enhanced.

In the line connection structure for the electric equipment, preferably, the electric equipment is for a voltage of not lower than 42V. Furthermore, preferably, every line for a voltage of not lower than 42V connected to the electric equipment is connected to the side surface of the electric equipment positioned on the rear side of the vehicle.

It is important to avoid damage to such a line connected to the electric equipment for high voltage. With the above-described configuration, such a high-voltage line can be protected.

In the line connection structure for the electric equipment, as one example, the electric equipment includes an inverter.

In some cases, to an inverter mounted on an electric vehicle, a line of relatively high voltage is connected. With the above-described configuration, the line connected to the inverter can be protected.

In the line connection structure for the electric equipment, as one example, the closed space is an engine room where an internal combustion engine is provided, and the further component includes a case of an air cleaner provided at an intake route of the internal combustion engine.

The space in the engine room is limited, and the line is often positioned between the electric equipment and the further component. In this respect, by the further component including a resin portion, the line can be protected.

In one aspect, the line connection structure for the electric equipment further includes a radiator provided along a front surface of the vehicle and on the front side of the vehicle relative to the electric equipment so as to face the electric equipment.

The radiator arranged along the front surface of the vehicle tends to move rearward due to an external factor such as front collision. By connecting the line from the vehicular rear side to the electric equipment, the line can be protected.

An electric vehicle according to the present invention includes the above-described line connection structure for the electric equipment. In the electric vehicle, preferably, the line connection structure for the electric equipment is applied to a line connection structure between an inverter as the electric equipment and a rotating electric machine for driving of the vehicle. Thus, an electric vehicle including the line connection structure for the electric equipment capable of protecting the line while suppressing an increase in the number of components can be obtained. It is to be noted that the term "electric vehicle" in the present specification includes a hybrid vehicle, a fuel-cell vehicle, and an electric vehicle.

According to the present invention, as described above, a line connection structure for electric equipment being capable of protecting a line while suppressing an increase in the number of components and being capable of preventing contact between the line and a further component in a normal mode even when the clearance between the electric equipment and the further component is narrow can be obtained.

It is to be noted that two or more of the above-described configurations can be combined as appropriate.

BRIEF DESCRIPTION OF THE DRAWINGS

FIG. 10 illustrates a structure of an air cleaner.

BEST MODES FOR CARRYING OUT THE INVENTION

Figure 1:
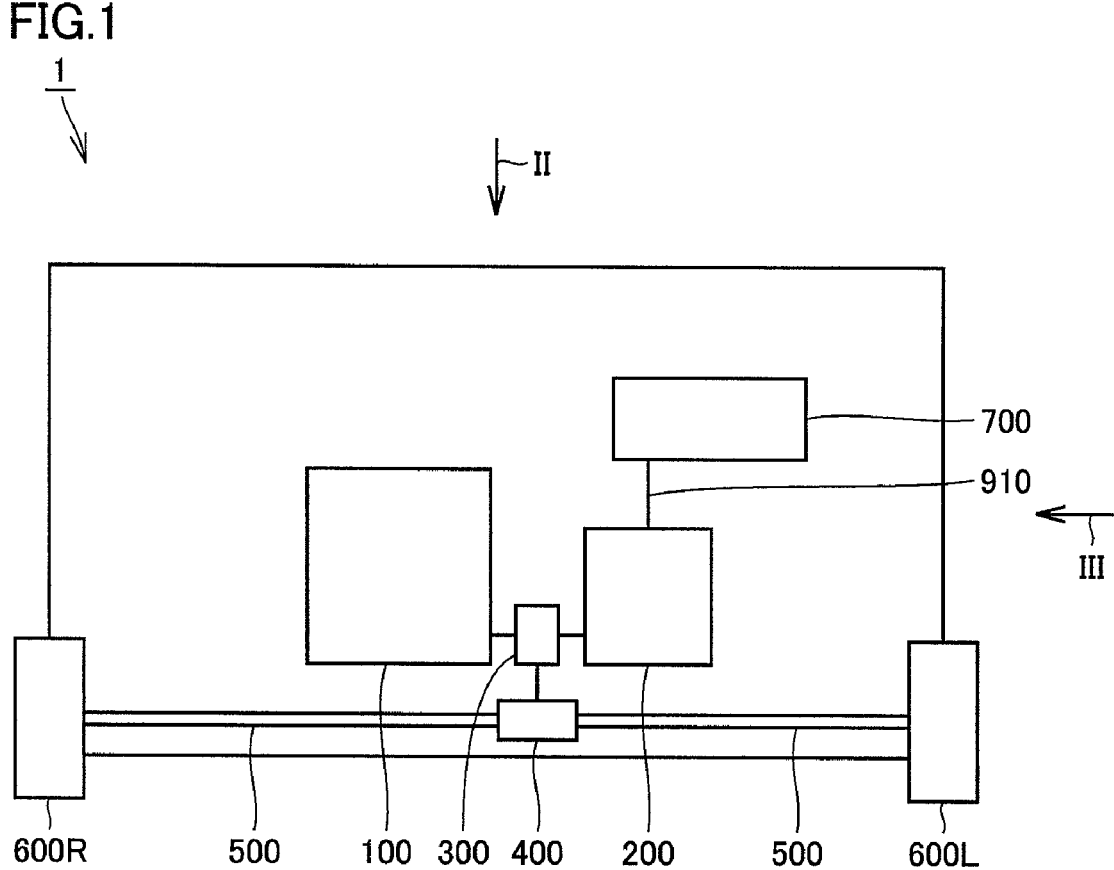
FIG. 1 is a schematic view showing a configuration of a hybrid vehicle including a line connection structure for electric equipment according to one embodiment of the present invention.

In the following, an embodiment of the present invention will be described. The same or corresponding parts are denoted by the same reference character and description thereof may not be repeated.

In the embodiment described in the following, reference to the number or quantity does not necessarily limit the scope of the present invention to the exact number or quantity, unless otherwise specified. Also, in the following embodiment, constituents are not necessarily essential for the present invention, unless otherwise specified. When there are several embodiments in the following, combination of the configurations of the embodiments as appropriate is originally envisaged, unless otherwise specified.

Figure 2:
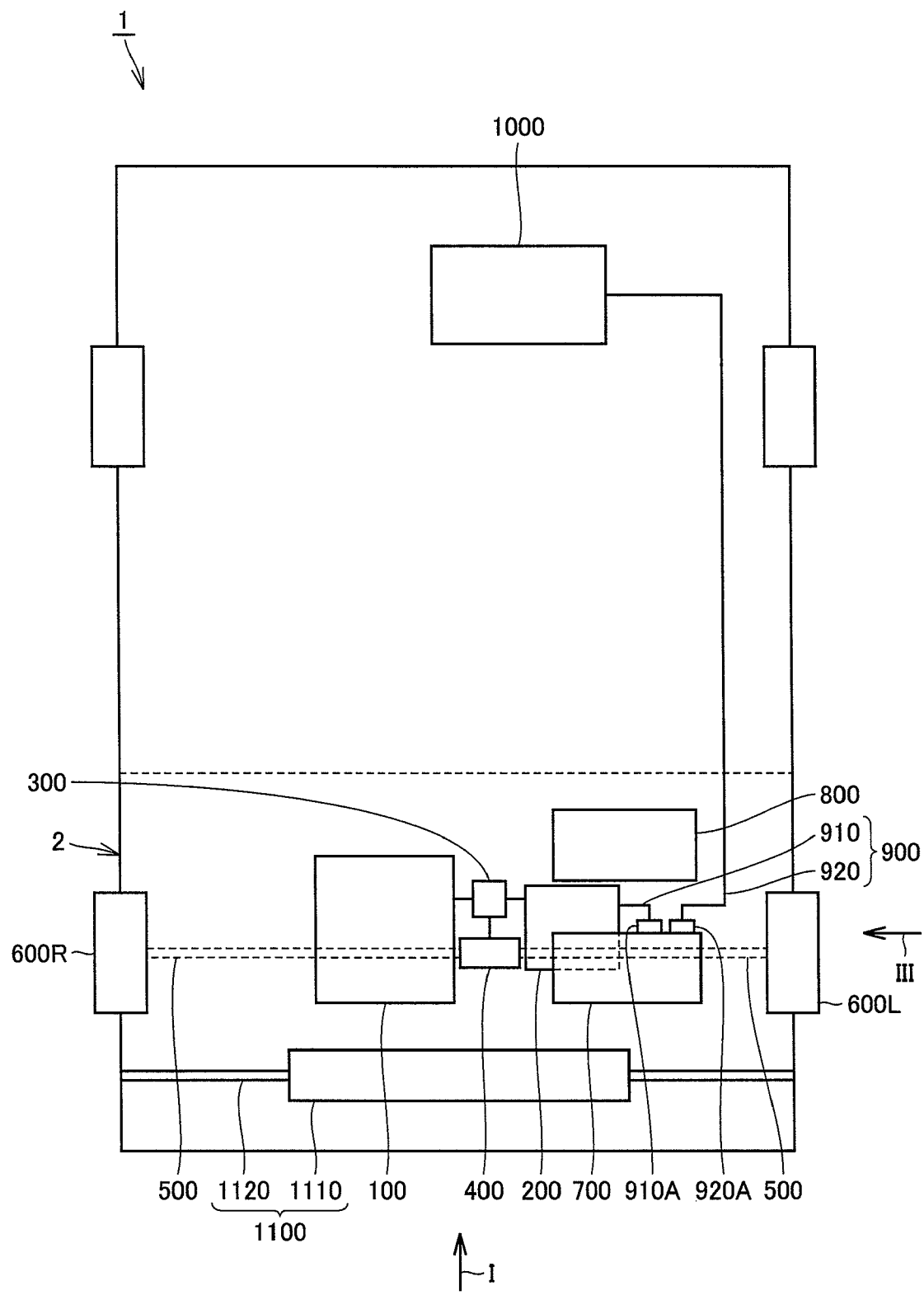
FIG. 2 is a schematic view showing the configuration of the hybrid vehicle as seen from the direction of arrow II in FIG. 1.
Figure 3:
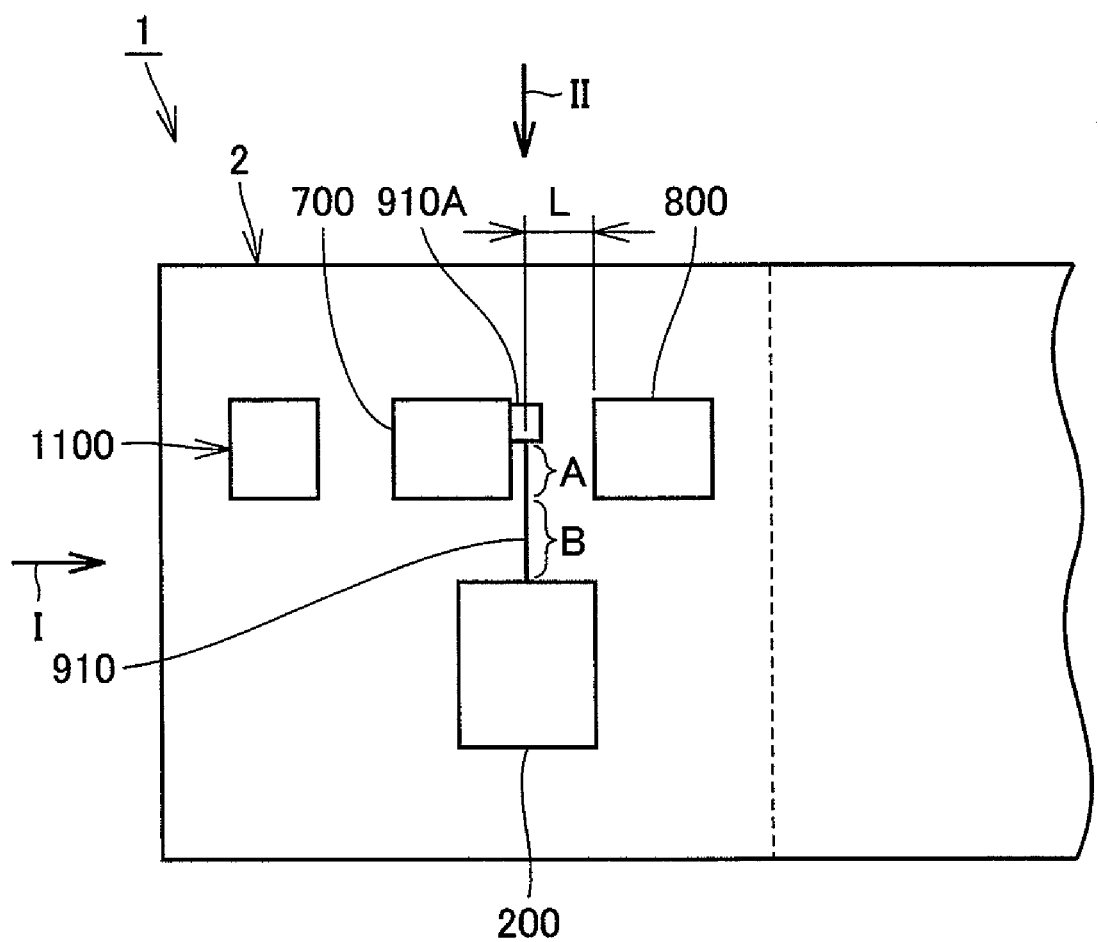
FIG. 3 is a schematic view showing the configuration of the hybrid vehicle as seen from the direction of arrow III in FIG. 1.

FIGS. 1-3 are schematic views showing a configuration of a hybrid vehicle having a line connection structure for electric equipment according to one embodiment of the present invention. FIGS. 1-3 respectively show the hybrid vehicle as seen from the directions of arrow I (FIGS. 2 and 3), arrow II (FIGS. 1 and 3), arrow III (FIGS. 1 and 2).

Referring to FIGS. 1-3, a hybrid vehicle 1 includes an engine 100, a motor-generator (rotating electric machine) 200, a power split device 300, a differential mechanism 400, a driveshaft 500, driving wheels 600L, 600R being the front wheels, a PCU (Power Control Unit) 700, an air cleaner 800, a battery 1000, and a radiator 1100.

As shown in FIGS. 2 and 3, engine 100, motor-generator 200, power split device 300, PCU 700, air cleaner 800, and radiator 1100 are arranged inside an engine room 2. Motor-generator 200 and PCU 700 are connected by a cable 910. PCU 700 and battery 1000 are connected by a cable 920. A power output apparatus formed by engine 100 and motor-generator 200 is coupled to differential mechanism 400 through power split device 300. Differential mechanism 400 is coupled to driving wheels 600L, 600R via driveshaft 500.

Motor-generator 200 is a three-phase AC (alternating current) synchronous motor-generator that generates drive force by AC power received from PCU 700. Motor-generator 200 is also used as a generator upon deceleration or the like of hybrid vehicle 1. By the generation function (regeneration), motor-generator 200 generates AC power which is output to PCU 700.

PCU 700 converts a DC (direct current) voltage received from battery 1000 into an AC voltage and exerts control to drive motor-generator 200. PCU 700 also converts an AC voltage generated by motor-generator 200 into a DC voltage and charges battery 1000.

Power split device 300 is configured to include a planetary gear (not shown), for example. Radiator 1100 includes a radiator body 1110 and a radiator support 1120 supporting the body.

The motive power output from engine 100 and/or motor-generator 200 is transmitted from power split device 300 through differential mechanism 400 to driveshaft 500. The drive power transmitted to driveshaft 500 is transmitted to driving wheels 600L, 600R as rotation power, thereby allowing the vehicle to travel. Thus, motor-generator 200 functions as a motor.

On the other hand, upon deceleration or the like of the vehicle, motor-generator 200 is driven by driving wheels 600L, 600R or engine 100. Here, motor-generator 200 functions as a generator. The power generated by motor-generator 200 is stored in battery 1000 through an inverter inside PCU 700.

Figure 4:
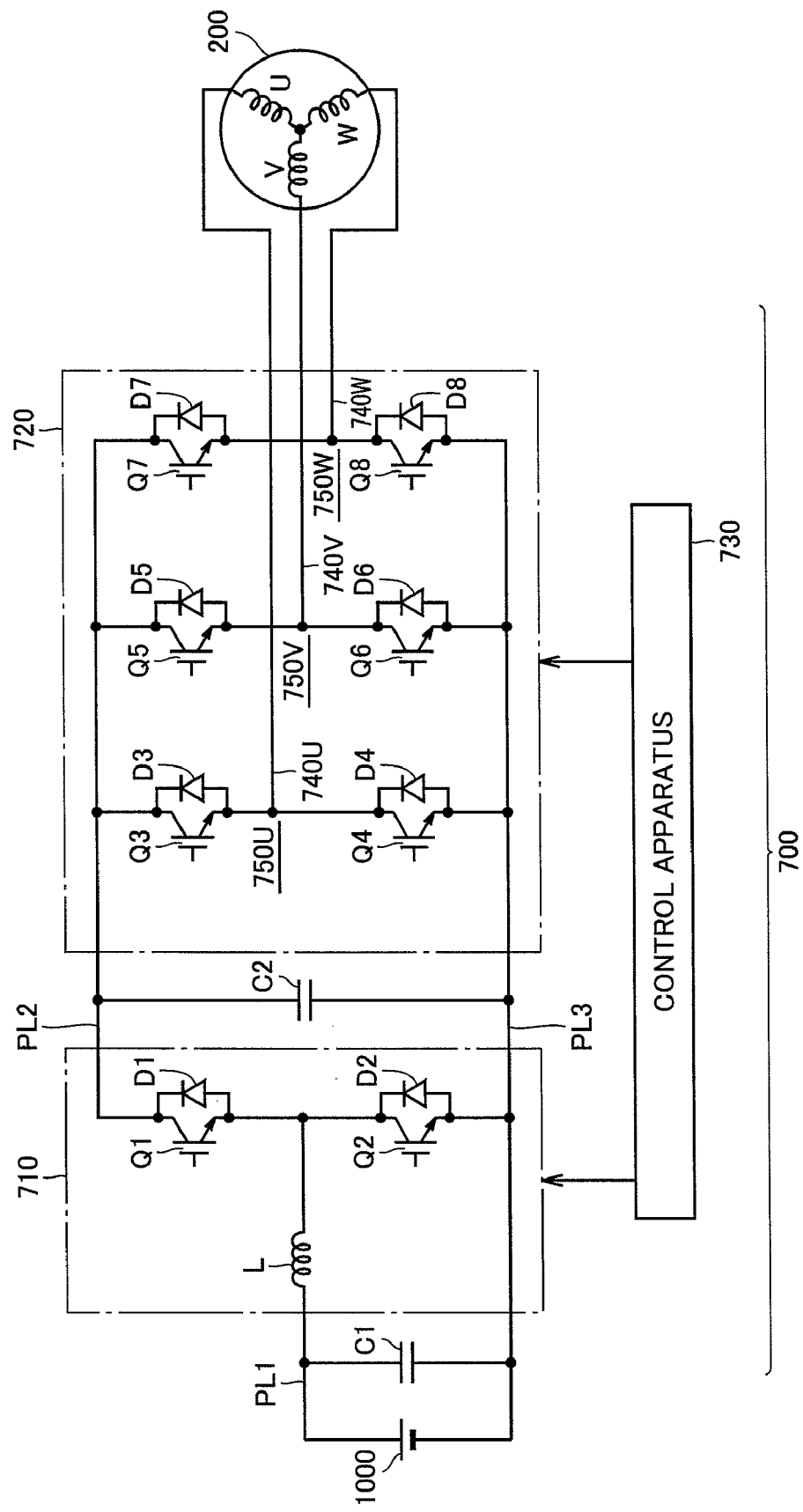
FIG. 4 shows a configuration of a substantial part of a PCU shown in FIGS. 1-3.

FIG. 4 is a circuit diagram showing a configuration of a substantial part of PCU 700. Referring to FIG. 3, PCU 700 includes a converter 710, an inverter 720, a control apparatus 730, capacitors C1, C2, power supply lines PL1-PL3, and output lines 740U, 740V, 740W. Converter 710 is connected between battery 1000 and inverter 720. Inverter 720 is connected to motor-generator 200 through output lines 740U, 740V, 740W.

Battery 1000 connected to converter 710 is a rechargeable battery such as a nickel-hydride or lithium ion battery. Battery 1000 supplies the generated DC voltage to converter 710, and is charged by the DC voltage received from converter 710.

Converter 710 is formed by power transistors Q1, Q2, diodes D1, D2, and a reactor L. Power transistors Q1, Q2 are connected in series between power supply lines PL2, PL3, and receive at the base a control signal from control apparatus 730. Diodes D1, D2 are connected between collector and emitter of power transistors Q1, Q2, respectively, so as to pass currents from emitter side to collector side of power transistors Q1, Q2. Reactor L has one end connected to power supply line PL1 that is connected to the positive electrode of battery 1000, and has the other end connected to a connection point of power transistors Q1 and Q2.

Converter 710 uses reactor L to boost a DC voltage received from battery 1000, and supplies the boosted boost voltage to power supply line PL2. Also, converter 710 steps down a DC voltage received from inverter 720 and charges battery 1000.

Inverter 720 is formed by a U-phase arm 750U, a V-phase arm 750V and a W-phase arm 750W. These phase arms are connected in parallel between power supply lines PL2 and PL3. U-phase arm 750U includes power transistors Q3, Q4 connected in series. V-phase arm 750V includes power transistors Q5, Q6 connected in series. W-phase arm 750W includes power transistors Q7, Q8 connected in series. Diodes D3-D8 are connected between collector and emitter of power transistors Q3-Q8, respectively, so as to pass currents from emitter side to collector side of power transistors Q3-Q8. In each phase arm, the power transistors have their connection point connected through output line 740U, 740V, or 740W to a node of each phase coil of motor-generator 200 being opposite to the neutral point.

Based on a control signal from control apparatus 730, inverter 720 converts a DC voltage received from power supply line PL2 into an AC voltage and outputs the same to motor-generator 200. Inverter 720 rectifies an AC voltage generated by motor-generator 200 into a DC voltage and supplies the same to power supply line PL2.

Capacitor C1 is connected between power supply lines PL1 and PL3, and smoothes the voltage level of power supply line PL1. Capacitor C2 is connected between power supply lines PL2 and PL3 and smoothes the voltage level of power supply line PL2.

Control apparatus 730 calculates each phase coil voltage of motor-generator 200 based on a motor torque command value, each phase current value of motor-generator 200, and an input voltage of inverter 720. Based on the calculation result, control apparatus 730 generates a PWM (Pulse Width Modulation) signal turning on/off power transistors Q3-Q8 and outputs the same to inverter 720.

Control apparatus 730 calculates a duty ratio of power transistors Q1, Q2 for optimizing the input voltage of inverter 720, based on the above-mentioned motor torque command value and a motor rotation speed. Based on the calculation result, control apparatus 730 generates a PWM signal turning on/off power transistors Q1, Q2 and outputs the same to converter 710.

Furthermore, control apparatus 730 exerts control over the switching operation of power transistors Q1-Q8 in converter 710 and inverter 720, so as to convert AC power generated by motor-generator 200 into DC power and charge battery 1000.

In PCU 700, based on a control signal from control apparatus 730, converter 710 boosts a DC voltage received from battery 1000 and supplies the same to power supply line PL2. Inverter 720 receives from power supply line PL2 a DC voltage smoothed by capacitor C2. Inverter 720 converts the received DC voltage into an AC voltage and outputs the same to motor-generator 200.

Inverter 720 converts an AC voltage generated by regenerative operation of motor-generator 200 into a DC voltage, and outputs the same to power supply line PL2. Then, converter 710 receives from power supply line PL2 a DC voltage smoothed by capacitor C2. Converter 710 steps down the received DC voltage and charges battery 1000.

Cable 900 (910, 920) shown in FIGS. 1-3 is a high-voltage line used at relatively high voltage (for example, about not lower than 200V and not higher than 600V). Accordingly, it is important to protect cable 900 and to prevent leak from cable 900.

For example, there may be a case where radiator 1100 provided along the front surface of the vehicle moves rearward due to an external factor such as front collision of the vehicle. In such a case, it is necessary to protect cable 900 so as to prevent damage to cable 900.

Figure 5:
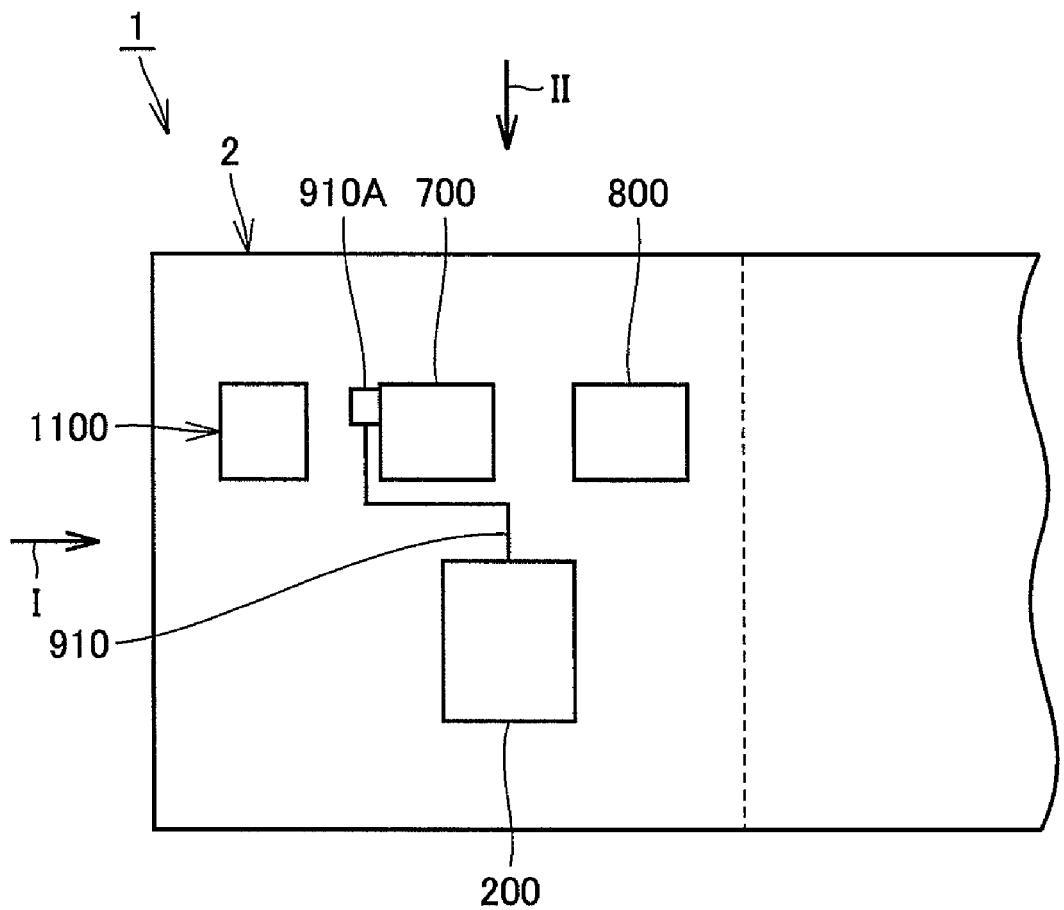
FIG. 5 is a schematic view showing a configuration of a hybrid vehicle including a line connection structure for electric equipment according to a comparative example.

FIG. 5 shows a line connection structure for PCU 700 according to a comparative example. Referring to FIG. 5, in the connection structure according to the comparative example, a connection portion 910A of cable 910 connected to PCU 700 is provided on the front side of the vehicle. Accordingly, when radiator 1100 moves toward PCU 700 due to an external factor such as front collision, cable 910 may be caught between PCU 700 and radiator 1100. In the present embodiment, radiator support 1120 supporting radiator body 1110 and a casing of PCU 700 are formed by metal members. It is not preferable if cable 910 is caught by such metal members from a standpoint of cable protection.

In this respect, in the present embodiment, as shown in FIGS. 2 and 3, connection portion 910A of cable 910 to PCU 700 is provided on the side surface on the vehicular rear side of PCU 700. Thus, even when radiator 1100 including the metal member moves toward PCU 700, cable 910 can be prevented from being caught between PCU 700 and radiator 1100. It is to be noted that, in the present embodiment, air cleaner 800 is provided on the rear side of PCU 700. As will be described later, because air cleaner 800 is a component that easily deforms when receiving loads, even when PCU 700 moves toward air cleaner 800 and cable 910 is caught between PCU 700 and air cleaner 800, air cleaner 800 absorbs the shock, whereby cable 910 can be protected.

It is to be noted that air cleaner 800 is not a component dedicated to absorb the shock, but it is "vehicle equipment" having functions in addition to the shock absorbing function. Thus, by arranging air cleaner 800 having the function of the shock absorbing function and the other functions at the position so as to face the rear side surface, in the vehicular front-rear direction, of PCU 700, cable 910 can be protected without increasing the number of components.

Figure 6:
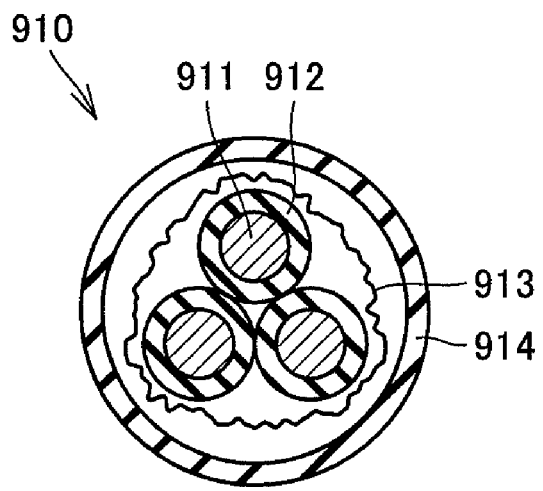
FIG. 6 is a cross-sectional view (No. 1) showing an example of a line included in a line connection structure for electric equipment according to one embodiment of the present invention.
Figure 7:
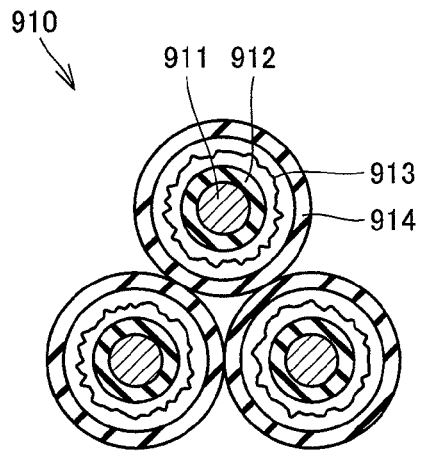
FIG. 7 is a cross-sectional view (No. 2) showing an example of a line included in a line connection structure for electric equipment according to one embodiment of the present invention.

FIGS. 6 and 7 are cross-sectional views showing examples of cable 910. In the example of FIG. 6, cable 910 is configured to include a copper wire portion 911 and a resin portion 912 formed for each of U-, V- and W-phases, and a braiding 913 and a corrugated tube 914 provided around them. In the example of FIG. 7, cable 910 is configured to include copper wire portion 911, resin portion 912, braiding 913, and corrugated tube 914 formed for each of U-, V- and W-phases.

As many components are installed in engine room 2, the space for arranging cable 910 is often relatively limited. Accordingly, for example as shown in FIG. 3, there may be a case where a distance (L) between cable 910 and air cleaner 800 arranged behind it is short. On the other hand, there is a need to avoid contact of cable 910 and air cleaner 800 as much as possible, in a normal mode.

Figure 8:
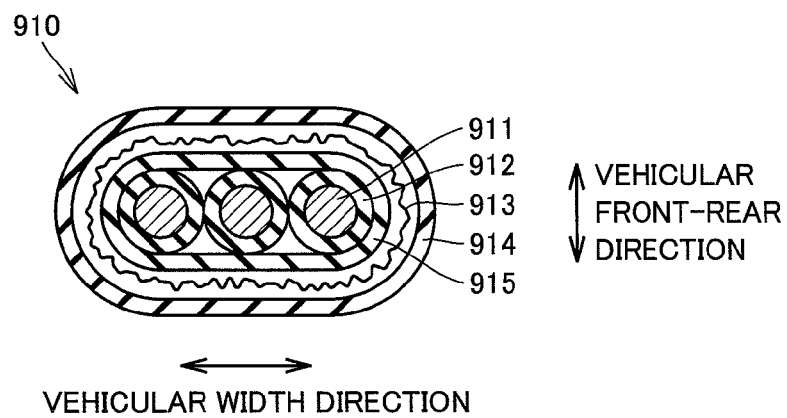
FIG. 8 is a cross-sectional view (No. 1) showing a more preferable example of a line included in a line connection structure for electric equipment according to one embodiment of the present invention.
Figure 9:
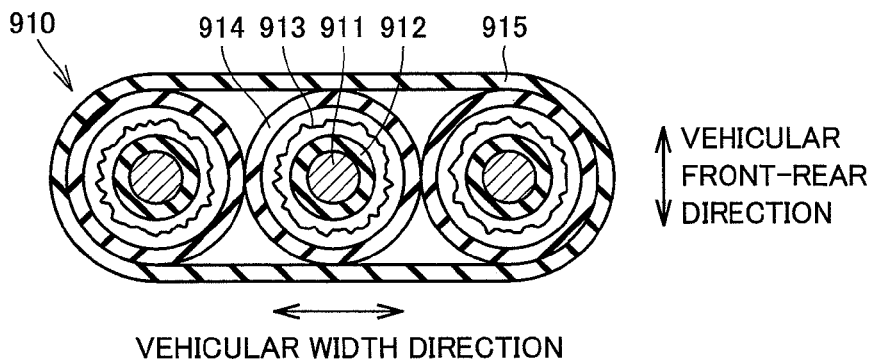
FIG. 9 is a cross-sectional view (No. 2) showing a more preferable example of a line included in a line connection structure for electric equipment according to one embodiment of the present invention.

FIGS. 8 and 9 are cross-sectional views showing more preferable examples of cable 910. Here, the example of FIG. 8 corresponds to a modification of the example of FIG. 6, while the example of FIG. 9 corresponds to a modification of the example of FIG. 7. In the examples of FIGS. 8 and 9, cable 910 has its cross section flattened so that its width in the vehicular front-rear direction is reduced. Here, the U-, V- and W-phase cables are bound by a binding band 915 so that the U-, V- and W-phase cables align on the identical plane parallel to the vehicular width direction. Thus, even when the distance between cable 910 and air cleaner 800 is short, contact between cable 910 and air cleaner 800 in a normal mode can be avoided. It is to be noted that the flat cross section shown in FIGS. 8 and 9 may only be employed for the portion of cable 910 positioned between PCU 700 and air cleaner 800 (portion A in FIG. 3) and the substantially circular cross section shown in FIGS. 6 and 7 may be employed for the other portion (portion B in FIG. 3).

FIG. 10 illustrates a structure of air cleaner 800. Referring to FIG. 10, air cleaner 800 includes an air cleaner case 810 and a filter 820. The air flown into air intake port 1200 in the arrow DR1 direction flows along the arrow DR2 direction, and led to the inside of air cleaner case 810. The air reaching air cleaner case 810 passes through filter 820. As a result, dust or the like in the air is removed. The air having passed through filter 820 flows in the arrow DR3, DR4 directions and led to the air intake portion of engine 100.

In air cleaner 800 shown in FIG. 10, air cleaner case 810 is a component made of resin. Filter 820 stored in air cleaner case 810 is, for example, a fine filter paper containing fibers. Thus, air cleaner 800 is configured to include a resin-made portion (air cleaner case 810), and it deforms easier than PCU 700 when receiving a load such as collision load.

According to the line connection structure for PCU 700 of the present embodiment, even when radiator 1100 moves toward PCU 700 due to an external factor, the line can be prevented from being caught between radiator 1100 and PCU 700. Therefore, it is possible to protect cable 910 connected to PCU 700 while suppressing an increase in the number of components.

In the line connection structure for PCU 700 above, by arranging the three-phase cables constituting cable 910 positioned between PCU 700 and air cleaner 800 so as to align on the identical plane parallel to the vehicular width direction, the width of cable 910 in the vehicular front-rear direction can be narrowed. Thus, even when the clearance between PCU 700 and air cleaner 800 is narrow, contact between cable 910 and air cleaner 800 in a normal mode can be avoided.

In the line connection structure for PCU 700 above, by air cleaner 800 including the resin portion that deforms easier than PCU 700, even when PCU 700 moves due to an external factor and cable 910 is caught between PCU 700 and air cleaner 800, air cleaner 800 can deform to thereby absorb the shock.

Summarizing the above-described configuration, the line connection structure for PCU 700 according to the present embodiment includes: PCU 700 as "electric equipment" mounted inside engine room 2 as a "closed space" positioned on the front side of hybrid vehicle 1; air cleaner 800 as a "further component" that is positioned on the rear side of hybrid vehicle 1 relative to PCU 700 so as to face PCU 700 and that includes a resin portion deforming easier than the electric equipment; and cable 910 as a "line" connected to PCU 700. Cable 910 is formed by three-phase cables of U-, V-, and W-phases being gathered. Cable 910 is connected to PCU 700, at the side surface of PCU 700 positioned on the vehicular rear side. That is, cable 910 is arranged on the vehicular-rear-side surface of PCU 700. The three-phase cables positioned between PCU 700 and air cleaner 800 are arranged so as to align on the identical plane parallel to the width direction of hybrid vehicle 1.

The line connection structure for PCU 700 of the present embodiment further includes radiator 1100 as a "front member" positioned on the front side of the vehicle relative to PCU 700 so as to face PCU 700 with a distance from PCU 700.

In the present embodiment, as above, the description has been provided about the case where: engine room 2 of hybrid vehicle 1 constitutes a "closed space of the vehicle"; PCU 700 including converter 710, inverter 720 and capacitors C1, C2 constitutes "electric equipment"; radiator 1100 constitutes a "front member"; and air cleaner 800 provided in the air intake route of engine 100 constitutes a "further component". Generally, the space inside the engine room of a vehicle is limited, and often a line is positioned between PCU 700 and a further component. By providing connection portion 910A being a "line drawing portion" of PCU 700 on the vehicular rear side (on the side facing air cleaner 800), cable 910 can be protected.

While the description has been provided about the example of cable 910 connecting inverter 720 in PCU 700 and motor-generator 200 as a "rotating electric machine for driving" of the hybrid vehicle, the same idea is naturally applicable to cable 920 connecting PCU 700 and battery 1000.

It is to be noted that the "vehicle", "closed space", "electric equipment", "front member" and "further component" are not limited to "hybrid vehicle 1", "engine room 2", "PCU 700", "radiator 1100", and "air cleaner 800", respectively. For example, a unit other than PCU 700 that is of relatively high voltage (for example, about not lower than 42V) and of which connection line should desirably be protected may correspond to the "electric equipment". For example, as "electric equipment", equipment including at least one of a converter (for example, a DC-DC converter), an inverter and a capacitor or an actuator of high voltage can be used. Also, "further component" positioned behind PCU 700 to protect cable 900 is not limited to air cleaner 800, and an arbitrary component including a resin portion capable of protecting cable 900 with a simple structure may be applicable. Furthermore, engine 100 being an "internal combustion engine" may be a gasoline engine or a diesel engine.

As to the foregoing description of the embodiment of the present invention, it should be understood that the embodiment disclosed herein is illustrative and non-restrictive in every respect. The scope of the present invention is defined by the terms of the claims, and is intended to include any changes within the scope and meaning equivalent to the terms of the claims.

INDUSTRIAL APPLICABILITY

The present invention is applicable to a line connection structure for electric equipment and to an electric vehicle or the like, for example.

The invention claimed is:

1. A line connection structure for electric equipment, comprising:
   said electric equipment mounted in a closed space positioned on a front side of a vehicle;
   a further component positioned toward a rear side of the vehicle relative to said electric equipment such that a front surface of said further component faces a rear side of said electric equipment; and
   a cable connected to said electric equipment and another electric component,
   said cable comprising lines of a plurality of phases,
   said cable connected to said electric equipment on the rear side of said electric equipment that faces the rear side of the vehicle and said lines being arranged so as to align on an identical plane parallel to a width direction of the vehicle.

2. The line connection structure for the electric equipment according to claim 1, wherein
   said further component includes a resin portion that deforms easier than said electric equipment.

3. The line connection structure for the electric equipment according to claim 1, wherein
   said electric equipment is for a voltage of not lower than 42V.

4. The line connection structure for the electric equipment according to claim 1, wherein
   every line for a voltage of not lower than 42V connected to said electric equipment is connected to the side surface of said electric equipment that faces the rear side of the vehicle.

5. The line connection structure for the electric equipment according to claim 1, wherein
   said electric equipment includes an inverter.

6. The line connection structure for the electric equipment according to claim 1, wherein
   said closed space is an engine room where an internal combustion engine is provided, and
   said further component includes a case of an air cleaner provided at an intake route of said internal combustion engine.

7. The line connection structure for the electric equipment according to claim 1, further comprising
   a radiator provided along a front surface of the vehicle and on the front side of the vehicle relative to said electric equipment so as to face said electric equipment.

8. An electric vehicle comprising the line connection structure for the electric equipment according to claim 1.

9. The electric vehicle according to claim 8 being applied to a line connection structure between an inverter as said electric equipment and a rotating electric machine for driving of the vehicle.

10. The line connection structure for the electric equipment according to claim 1, wherein
    said cable has its cross section flattened so that its width in a front-rear direction of said vehicle is reduced.

11. The line connection structure for the electric equipment according to claim 1, wherein the cable has a width that is less than a height of the cable and the cable is positioned such that the width extends in a front-rear direction of the vehicle.

* * * * *